(12) United States Patent
Yoshida

(10) Patent No.: US 10,110,885 B2
(45) Date of Patent: Oct. 23, 2018

(54) THREE-DIMENSIONAL IMAGE DISPLAY APPARATUS

(71) Applicant: NATIONAL INSTITUTE OF INFORMATION AND COMMUNICATIONS TECHNOLOGY, Koganei-shi, Tokyo (JP)

(72) Inventor: Shunsuke Yoshida, Koganei (JP)

(73) Assignee: National Institute of Information andCommunications Technology, Tokyo (JP)

( * ) Notice: Subject to any disclaimer, the term of this patent is extended or adjusted under 35 U.S.C. 154(b) by 97 days.

(21) Appl. No.: 15/054,366

(22) Filed: Feb. 26, 2016

(65) Prior Publication Data

US 2016/0255340 A1    Sep. 1, 2016

(30) Foreign Application Priority Data

Feb. 27, 2015    (JP) .................................. 2015-039141

(51) Int. Cl.
   *G02B 5/02*       (2006.01)
   *H04N 13/39*      (2018.01)
   *H04N 13/324*     (2018.01)

(52) U.S. Cl.
   CPC .............. *H04N 13/39* (2018.05); *G02B 5/02* (2013.01); *G02B 5/0257* (2013.01); *H04N 13/324* (2018.05)

(58) Field of Classification Search
   CPC .. G02B 27/2285; G02B 27/2292; G02B 5/02; G02B 5/0205; G02B 5/021;
   (Continued)

(56) References Cited

U.S. PATENT DOCUMENTS 6,992,828 B2 *    1/2006    He ....................... G02B 5/0221
                                                              359/599
7,167,310 B2 *    1/2007    Engel ....................... G02B 5/02
                                                                359/15
(Continued)

FOREIGN PATENT DOCUMENTS

JP    2005-164768    6/2005
JP    2010-32952 A   2/2010
(Continued)

*Primary Examiner* — Thong Nguyen
(74) *Attorney, Agent, or Firm* — Westerman, Hattori, Daniels & Adrian, LLP

(57) ABSTRACT

On a surface of a screen, a first direction parallel to a virtual plane and a second direction orthogonal to the first direction are defined. A basic diffusion member of the screen diffuses and transmits each light ray at a first angle in a first plane parallel to the first direction, and diffuses and transmits the light ray at a second angle larger than the first angle in a second plane parallel to the second direction. An adjustment diffusion member of the screen diffuses and transmits each light ray at an adjustment angle larger than the first angle in the first plane. The basic diffusion member and the adjustment diffusion member are stacked on each other such that a diffusion angle of each light ray by the screen in the first plane is adjusted to a target angle larger than the adjustment angle.

3 Claims, 15 Drawing Sheets

(58) Field of Classification Search
CPC .. G02B 5/0252; G02B 5/0257; G02B 5/0263; G02B 5/0273; G02B 5/0278; H04N 13/0422; H04N 13/049; H04N 13/0445; H04N 9/3185; H04N 13/39; H04N 9/3195; G03B 21/14
See application file for complete search history.

(56) References Cited

U.S. PATENT DOCUMENTS

| | | | |
|---|---|---|---|
| 2012/0146897 A1* | 6/2012 | Yoshida | G02B 27/2292 345/156 |
| 2013/0176193 A1* | 7/2013 | Liu | G02B 27/2285 345/31 |
| 2013/0208356 A1 | 8/2013 | Saito | |
| 2014/0022222 A1* | 1/2014 | Kuo | G02B 5/021 345/205 |
| 2014/0104399 A1* | 4/2014 | Lee | H04N 13/0445 348/51 |
| 2014/0307064 A1* | 10/2014 | Horimai | G03B 21/14 348/51 |
| 2016/0037146 A1* | 2/2016 | McGrew | H04N 9/3185 606/27 |

FOREIGN PATENT DOCUMENTS

| | | |
|---|---|---|
| JP | 2010-81440 A | 4/2010 |
| JP | 4447292 B2 | 4/2010 |
| JP | 5170230 B2 | 3/2013 |

* cited by examiner

F I G. 3
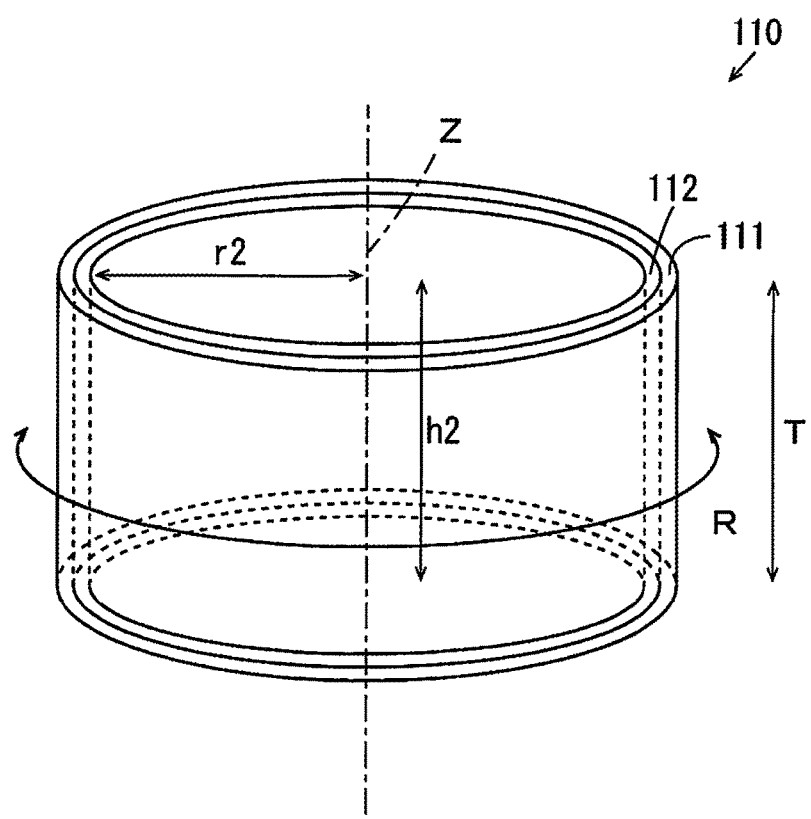

THREE-DIMENSIONAL IMAGE DISPLAY APPARATUS

BACKGROUND OF THE INVENTION

Field of the Invention

The present invention relates to a three-dimensional image display apparatus that displays a three-dimensional image.

Description of Related Art

Various types of three-dimensional image display apparatuses that present three-dimensional images have been developed (see JP 2010-32952 A and JP 2010-81440 A, for example). In a three-dimensional image display apparatus, a three-dimensional image is generally presented to a space in front of, behind, above or the like of a screen.

A three-dimensional image display apparatus (a three-dimensional display) described in JP 2010-32952 A has a light beam controller having a cone shape. The light beam controller is arranged such that a bottom of the cone shape is open on a reference plane. Further, a plurality of scanning projectors are arranged around the light beam controller to respectively irradiate an outer peripheral surface of the light beam controller with a light ray group made of a plurality of light rays from a position below the reference plane and outside of the light beam controller. The light beam controller transmits each light ray emitted by each scanning projector without diffusing in a circumferential direction. Thus, a three-dimensional image is displayed in a space above and inside of the light beam controller having a cone shape.

In a three-dimensional image display apparatus (a three-dimensional video image display apparatus) described in JP 2010-81440 A, a light ray corresponding to each pixel that constitutes a projection image is projected onto a screen by a projector. The screen transmits a light ray projected from the projector in a horizontal direction, and diffuses the light ray in a vertical direction. Thus, a three-dimensional image is displayed in a space in front of and behind the screen.

BRIEF SUMMARY OF THE INVENTION

In the three-dimensional image display apparatuses described in JP 2010-32952 A and JP 2010-81440 A, a three-dimensional image can be presented to several observers who are present around or in front of the screen (the light beam controller). In recent years, it is desired that a large-size three-dimensional image display apparatus that can present a three-dimensional image to the larger number of observers is developed.

In such a large-size three-dimensional image display apparatus, it is necessary to prepare the large-size screen. Further, the light transmission diffusion characteristics in each direction of the screen are determined while trial and error are repeated in consideration of a position of a view point of the observer, and the larger number of parameters such as positions and the number of the projectors. However, when the manufacture and test of the large screen are repeatedly performed in order to determine the light transmission diffusion characteristics, a cost and a manufacturing time period for the three-dimensional image display apparatus increase. Therefore, the manufacture of the large-size screen is difficult in reality.

An object of the present invention is to provide a three-dimensional image display apparatus capable of presenting a three-dimensional image to a large number of observers in a large space.

(1) According to one aspect of the present invention, a three-dimensional image display apparatus for presenting a three-dimensional image to an observer in a viewing area on a predetermined virtual plane based on three-dimensional data includes a screen having a stacking structure of first and second light transmission diffusion members, a light ray generator arranged to irradiate the viewing area with a light ray group made of a plurality of light rays through the screen, and a controller that controls the light ray generator such that the three-dimensional image is presented by the light ray group generated by the light ray generator based on the three-dimensional data, wherein a first direction parallel to the virtual plane is defined on a surface of the screen, and a second direction orthogonal to the first direction is defined on the surface of the screen, the first light transmission diffusion member is configured to diffuse and transmit each light ray from the light ray generator at a first angle in a first plane parallel to the first direction, and diffuse and transmit the light ray at a second angle larger than the first angle in a second plane parallel to the second direction, the second light transmission diffusion member is configured to diffuse and transmit each light ray from the light ray generator at an adjustment angle larger than the first angle in the first plane, the first and second light transmission diffusion members are stacked on each other such that a diffusion angle of each light ray by the screen in the first plane is adjusted to a target angle larger than the adjustment angle, and the target angle is a diffusion angle of each light ray with the viewing area in a case where a missing portion is not generated in the three-dimensional image in the first direction.

In this three-dimensional image display apparatus, a screen having a stacking structure of the first and second light transmission diffusion members is arranged. The viewing area on the predetermined virtual plane is irradiated with a light ray group made of a plurality of light rays by the light ray generator through the screen. The light ray generator is controlled based on the three-dimensional data, so that a three-dimensional image is presented by the light ray group.

On the surface of the screen, the first direction parallel to the virtual plane is defined, and the second direction orthogonal to the first direction is defined. The first transmission diffusion member diffuses and transmits each light ray from the light ray generator at a first angle in a first plane parallel to the first direction, and diffuses and transmits the light ray at a second angle larger than the first angle in a second plane parallel to the second direction. The second light transmission diffusion member diffuses and transmits each light ray from the light ray generator at the adjustment angle larger than the first angle in the first plane. Thus, the diffusion angle of each light ray by the screen in the first plane is adjusted to the target angle larger than the adjustment angle. Therefore, the observer can observe the three-dimensional image in which a missing portion is not generated in the first direction from the viewing area.

In this configuration, a stacking condition of the first and second light transmission diffusion members may be changed when the diffusion angle of each light ray by the screen is adjusted while trial and error are repeated in consideration of the viewing area, the positions and the number of the light ray generators and the like, and it is not necessary to repeat the manufacture and test of the screen. Therefore, even in the case where the size of the screen is increased, increases in cost and manufacturing time period for the screen are inhibited. As a result, the three-dimensional image can be presented to the large number of observers in a large space.

(2) Third and fourth directions orthogonal to each other may be defined on the second light transmission diffusion member, the second light transmission diffusion member may have characteristics for diffusing and transmitting each light ray from the light ray generator at a third angle in a third plane parallel to the third direction, and diffusing and transmitting the light ray at a fourth angle larger than the third angle in a fourth plane parallel to the fourth direction, and a diffusion angle of each light ray by the screen in the first plane may be adjusted to the target angle by an adjustment of an angle formed by the third direction of the second light transmission diffusion member with the first direction.

In this case, the first and second light transmission diffusion members are stacked on each other while a relative inclination of the second light transmission diffusion member with the first light transmission diffusion member is changed, whereby an angle formed by the third direction of the second light transmission diffusion member with the first direction can be adjusted. Thus, a diffusion angle of each light ray by the screen in the first plane can be adjusted. As a result, the diffusion angle of each light ray by the screen in the first plane can be adjusted to the target angle with a simple configuration.

(3) A diffusion angle of each light ray by the screen in the first plane may be adjusted to the target angle by selection of one light transmission diffusion member as the second light transmission diffusion member from a plurality of types of light transmission diffusion members respectively having different diffusion angles.

In this case, one light transmission diffusion member is selected from a plurality of types of light transmission diffusion members such that the diffusion angle of each light ray by the screen in the first plane is equal to the target angle. Thus, the diffusion angle of each light ray by the screen in the first plane can be adjusted to the target angle with a simple configuration.

(4) The first direction may be a horizontal direction, the screen may have a shape surrounding a center axis extending in a vertical direction, and the viewing area may be defined on a horizontal plane to surround the screen.

In this case, the observer can observe the three-dimensional image presented to a space above or inside of the screen with naked eyes from the viewing area defined on the horizontal plane to surround the screen.

(5) The screen may be cylindrical. In this case, the screen can be easily fabricated.

(6) The first direction may be a horizontal direction, the screen may have a planar shape, and the viewing area may be defined on a horizontal plane to be opposite to the screen.

In this case, the observer can observe the three-dimensional image presented to a space in front of or behind the screen with naked eyes from the viewing area defined on the horizontal plane opposite to the screen.

Other features, elements, characteristics, and advantages of the present invention will become more apparent from the following description of preferred embodiments of the present invention with reference to the attached drawings.

BRIEF DESCRIPTION OF THE SEVERAL VIEWS OF THE DRAWING

FIG. 3 is a perspective view of a screen of the three-dimensional image display apparatus of FIGS. 1 and 2;

DESCRIPTION OF THE PREFERRED EMBODIMENTS

[1] First Embodiment

A three-dimensional image display apparatus according to the first embodiment of the present invention will be described below with reference to drawings.

(1) Configuration of Three-Dimensional Image Display Apparatus

Figure 1:
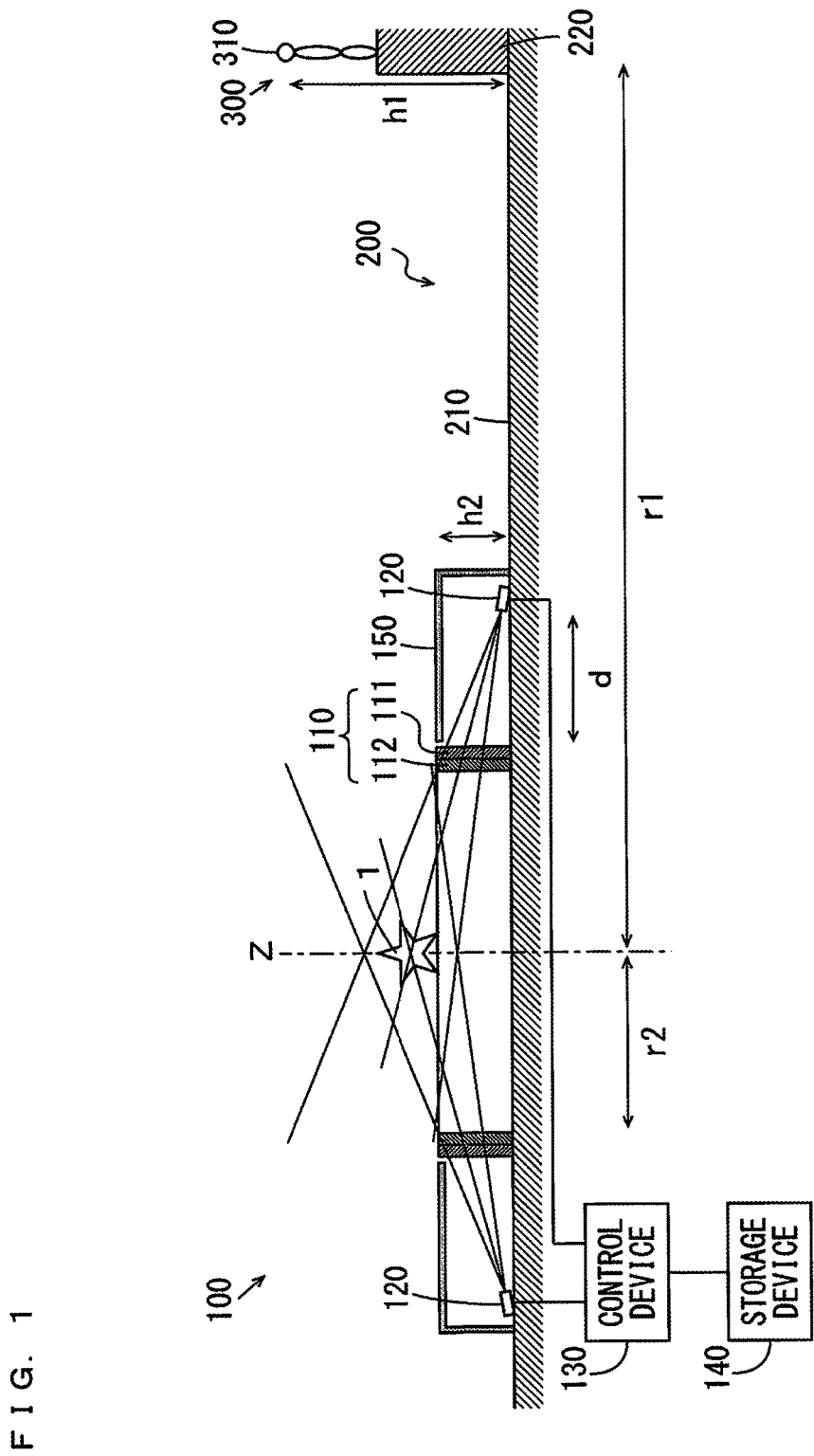
FIG. 1 is a schematic cross sectional view of a three-dimensional image display apparatus according to a first embodiment of the present invention.
Figure 2:
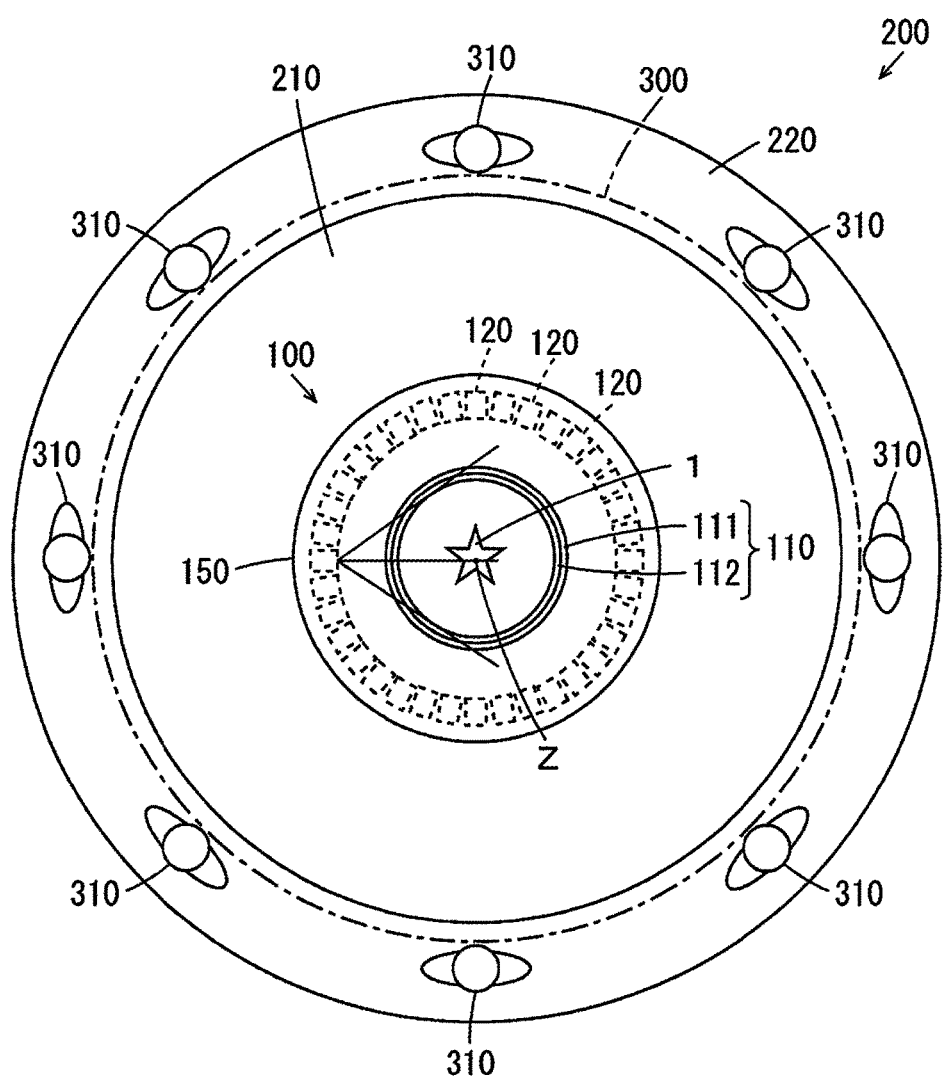
FIG. 2 is a schematic plan view of the three-dimensional image display apparatus of FIG. 1.

FIG. 1 is a schematic cross sectional view of the three-dimensional image display apparatus according to the first embodiment of the present invention. FIG. 2 is a schematic plan view of the three-dimensional image display apparatus 100 of FIG. 1. FIG. 3 is a perspective view of a screen of the three-dimensional image display apparatus 100 of FIGS. 1 and 2. As shown in FIG. 1, the three-dimensional image display apparatus 100 includes a cylindrical screen 110, a plurality of light ray generators 120, a control device 130, a storage device 140 and a cover member 150.

The three-dimensional image display apparatus 100 of FIGS. 1 and 2 is installed in a viewing venue 200. In the present example, the viewing venue 200 is a baseball ground, for example. The viewing venue 200 includes ground 210 and an auditorium 220. The ground 210 is substantially circular. The screen 110 of the three-dimensional image display apparatus 100 is arranged at substantially the center of the ground 210.

The auditorium 220 is annular, and is provided to surround the ground 210. An upper surface of the auditorium 220 is sufficiently higher than an upper surface of the ground 210. A plurality of viewers 310 are present in the auditorium 220. In FIG. 1, only one viewer 310 is shown. Further, in FIGS. 1 and 2, a measurement of the viewer 310 is shown larger than an actual measurement.

An annular viewing area 300 is defined on a horizontal plane (a virtual plane) having a height substantially equal to a view point of the viewer 310 in the auditorium 220. A radius of the viewing area 300 is r1, and the height from the ground 210 to the viewing area 300 is h1. In the present example, the radius r1 is 60 m, for example, and the height h1 is 15 m, for example.

As shown in FIG. 3, the screen 110 has a rotationally-symmetric cylindrical shape about an axis Z. A radius of the screen 110 is r2, and the height of the screen 110 is h2. In the present example, the radius r2 is 13 m, for example, and the height h2 is 5 m, for example. The plurality of viewers 310 (FIG. 2) can observe a space above and an inner peripheral surface of the screen 110 from the auditorium 220 (FIG. 1) located obliquely upward of the screen 110.

The screen 110 has the configuration in which a plurality of light transmission diffusion members are stacked. In the present example, the two light transmission diffusion members are stacked. One light transmission diffusion member is referred to as a basic diffusion member 111, and the other light transmission diffusion member is referred to as an adjustment diffusion member 112. Details of the configuration of the screen 110 will be described below. In a ridge line direction T and a circumferential direction R orthogonal to each other, light transmission diffusion characteristics of the screen 110 are different from each other.

As shown in FIG. 1, the plurality of light ray generators 120 are annularly arranged to surround the screen 110 about the axis Z of the screen 110. The shortest distance between the screen 110 and each light ray generator 120 is d. In the present example, the distance d is 10 m, for example. Further, a cover member 150 is arranged to cover a space outside and above the plurality of light ray generators 120. Thus, the plurality of light ray generators 120 are not viewed from the viewer 310 in the auditorium 220. The height of the cover member 150 is substantially equal to the height of the screen 110.

Each light ray generator 120 can emit a light ray and deflect the light ray in horizontal and vertical planes. Here, a light ray refers to the light shown by a non-diffusing straight line. Each light ray generator 120 is provided to scan an outer peripheral surface of the screen 110 from an obliquely downward position with a light ray. Thus, each light ray generator 120 can emit a light ray group made of a plurality of light rays to the outer peripheral surface of the screen 110.

Each light ray generator 120 is a scanning projector, for example. The light ray generator 120 may be a general projector including a spatial light modulator and a projection system such as a lens array made of a plurality of lenses. In the case where an aperture (an opening) of the projection system is sufficiently small, a light ray group can be formed similarly to the scanning projector. The spatial light modulator is a DMD (Digital Micromirror Device), an LCD (Liquid Crystal Display) or an LCOS (Liquid Crystal on Silicon), for example.

The control device 130 is made of a personal computer, for example. The storage device 140 is made of a hard disc, a memory card and the like. A three-dimensional data for presenting a three-dimensional image 1 is stored in the storage device 140. The control device 130 controls the plurality of light ray generators 120 based on the three-dimensional data stored in the storage device 140. Thus, the three-dimensional image 1 is presented to a space above the screen 110. The large number of viewers 310 who are present in the auditorium 220 can observe the three-dimensional image 1 from any position in the viewing area 300.

While the three-dimensional image 1 is presented to a space above the screen 110 in the present embodiment, the present invention is not limited to this. The three-dimensional image 1 may be presented to a space inside of the screen 110. The radius r2 of the screen 110 configured to present the three-dimensional image 1 to the space inside can be smaller than the radius r2 (13 m in the present example) of the screen 110 configured to present the three-dimensional image 1 to the space above.

(2) Configuration and Manufacturing Method of Screen

Figure 4A:
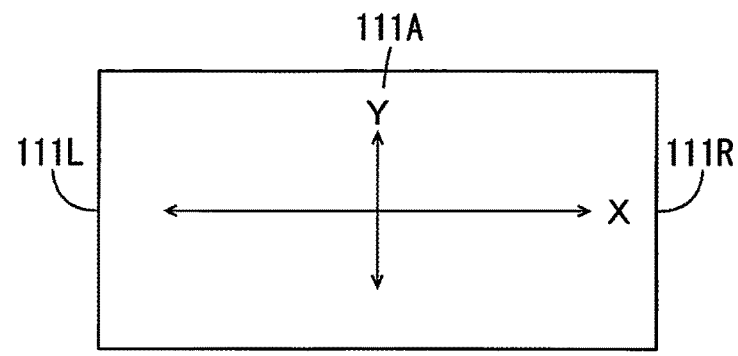
FIGS. 4A to 4D are diagrams for explaining the configuration and function of a basic diffusion member of the screen.
Figure 4B:
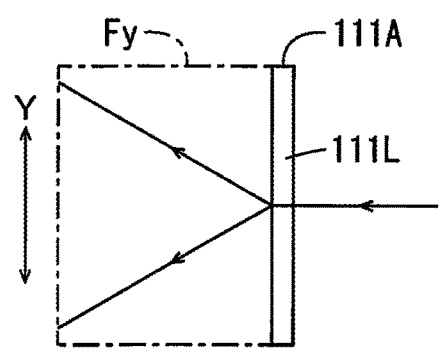
Figure 4C:
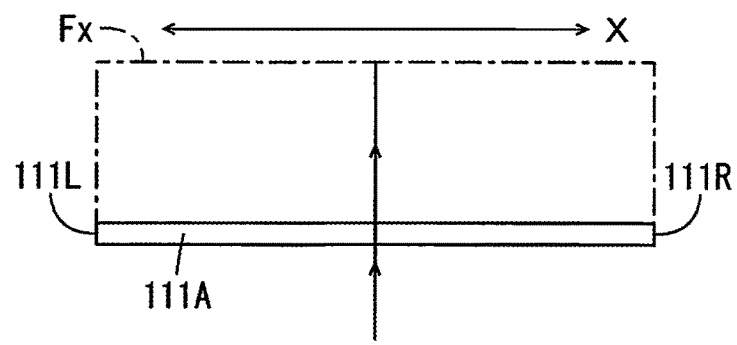
Figure 4D:
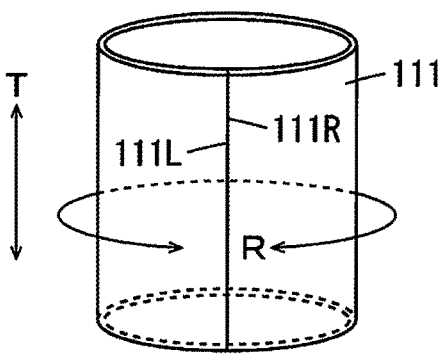

FIGS. 4A to 4D are diagrams for explaining the configuration and function of the basic diffusion member 111 of the screen 110. FIG. 4A shows a front view of the light transmission diffusion film that constitutes the basic diffusion member 111. FIGS. 4B and 4C show a side view and a top view of the light transmission diffusion film 111A of FIG. 4A, respectively. FIG. 4D shows a perspective view of the cylindrical basic diffusion member 111.

Hereinafter, two directions orthogonal to each other are respectively referred to as an X direction and a Y direction. As shown in FIG. 4A, the light transmission diffusion film 111A is prepared. The light transmission diffusion film 111A has a rectangular shape extending in one direction. A longitudinal direction and a width direction of the light transmission diffusion film 111A coincide with the X and Y directions, respectively. One end and the other end of the light transmission diffusion film 111A in the X direction are referred to as a left end portion 111L and a right end portion 111R, respectively.

The light transmission diffusion film 111A is an anisotropic diffusion member, and has different configurations in the X and Y directions orthogonal to each other. The light transmission diffusion film 111A may be a lenticular sheet or a holographic screen. The light transmission diffusion film 111A may have the configuration in which a resin layer including a fine light diffusion material is formed on a surface of a flat sheet-like member having transmissivity. In this case, the fine light diffusion material has an elliptical shape or a fiber form, for example.

A plane parallel to the Y direction and orthogonal to the light transmission diffusion film 111A is referred to as a Y plane Fy, and a plane parallel to the X direction and orthogonal to the light transmission diffusion film 111A is referred to as an X plane Fx. The Y plane Fy is indicated by a one-dot and dash line in FIG. 4B, and the X plane Fx is indicated by a one-dot and dash line in FIG. 4C. A light ray incident on the light transmission diffusion film 111A is largely diffused and transmitted in the Y direction in the Y plane Fy as shown in FIG. 4B, and advances in a substantially straight line and is transmitted while being slightly diffused in the X plane Fx as shown in FIG. 4C.

In this manner, a diffusion angle (an example of a first angle) in the X plane Fx (an example of a first plane) is smaller than a diffusion angle (an example of a second angle) in the Y plane Fy (an example of a second plane). The diffusion angle in the X direction may be 1/10 or less of the diffusion angle in the Y direction. In the present embodiment, the diffusion angle in the Y direction is 60 degrees, for example, and the diffusion angle in the X direction is 1 degree, for example. The diffusion angle in the X direction is not limited to this, and may be smaller than 1 degree, for example.

The left end portion 111L and the right end portion 111R of the light transmission diffusion film 111A are joined to each other. Thus, as shown in FIG. 4D, the cylindrical basic diffusion member 111 is fabricated. In this configuration, the basic diffusion member 111 is formed such that an incident light ray is largely diffused and transmitted in the ridge line direction T, and advances in a straight line and is transmitted without hardly being diffused in the circumferential direction R.

While the light transmission diffusion film 111A is constituted by an anisotropic diffusion member having one large area in the above-mentioned embodiment, the present invention is not limited to this. The light transmission diffusion film 111A may be constituted by an anisotropic diffusion member having a plurality of small areas. For example, the basic diffusion member 111 may be fabricated by an attachment of the plurality of light transmission diffusion films 111A to an inner peripheral surface or an outer peripheral surface of a transparent cylindrical member.

While the basic diffusion member 111 is fabricated using the light transmission diffusion film 111A in the present embodiment, the present invention is not limited to this. The basic diffusion member 111 may be fabricated by performance of an etching process, a mechanic process, a laser process, a discharge process or the like on the inner surface or the outer surface of the transparent cylindrical member. The light transmission diffusion characteristics of the screen 110 in this case are similar to the light transmission diffusion characteristics of the screen 110 of FIG. 4D.

Figure 5A:
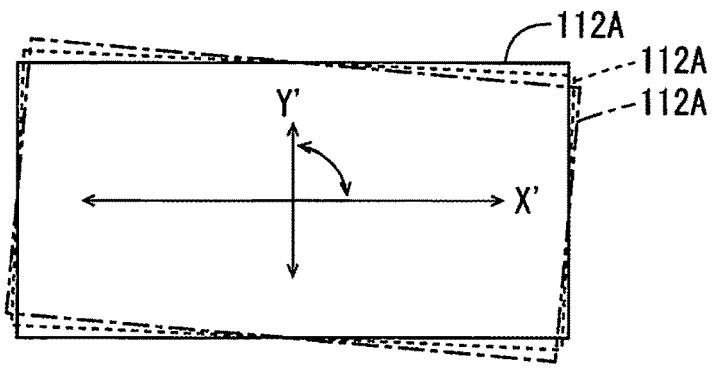
FIGS. 5A to 5D are diagrams for explaining the configuration and function of an adjustment diffusion member of the screen.
Figure 5B:
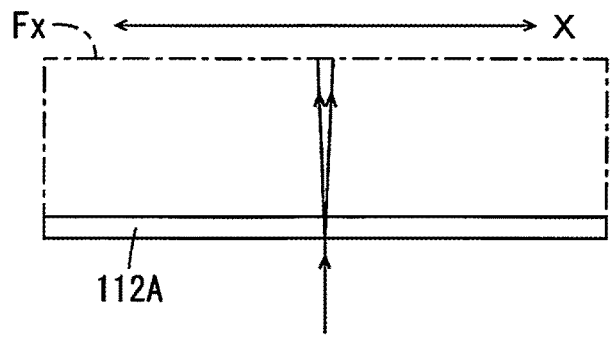
Figure 5C:
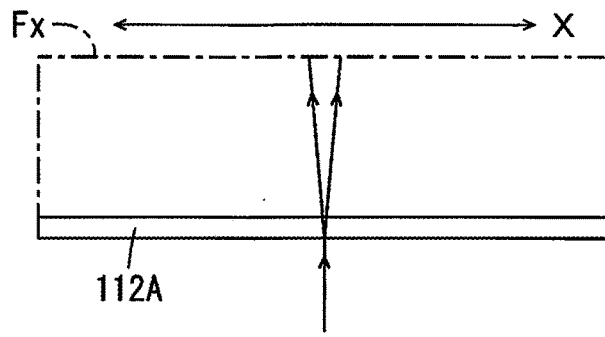
Figure 5D:
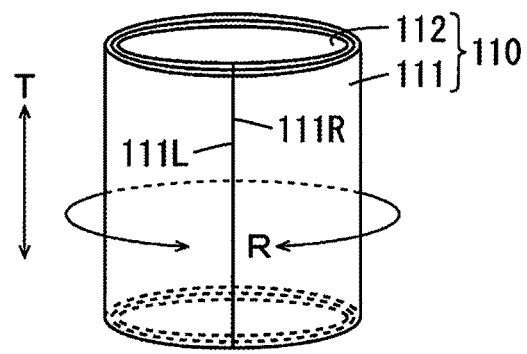

FIGS. 5A to 5D are diagrams for explaining the configuration and function of the adjustment diffusion member 112 of the screen 110. FIG. 5A shows a front view of the light transmission diffusion film that constitutes the adjustment diffusion member 112. FIGS. 5B and 5C show a top view of a light transmission diffusion film 112A of FIG. 5A. FIG. 5D shows a perspective view of the cylindrical screen 110.

As shown in FIG. 5A, the light transmission diffusion film 112A is prepared. The light transmission diffusion film 112A has a shape and the function similar to the light transmission diffusion film 111A of FIG. 4A. Hereinafter, two directions orthogonal to each other that are defined on the light transmission diffusion film 112A are respectively referred to as an X' direction and a Y' direction, and a plane parallel to the X' and Y' directions is referred to as a Z plane.

A diffusion angle in the Y' direction of a light ray transmitted through the light transmission diffusion film 112A is similar to the diffusion angle in the Y direction of the light ray transmitted through the light transmission diffusion film 111A of FIG. 4B. Further, a diffusion angle in the X' direction of the light ray transmitted through the light transmission diffusion film 112A is similar to the diffusion angle in the X direction of the light ray transmitted through the light transmission diffusion film 111A of FIG. 4C. That is, a diffusion angle (an example of a third angle) in a plane parallel to the X' direction (an example of a third plane) is smaller than a diffusion angle (an example of a fourth angle) in a plane parallel to the Y' direction (an example of the fourth plane).

As indicated by a solid line in FIG. 5A, a state in which the X' and Y' directions of the light transmission diffusion film 112A respectively coincide with the X and Y directions of FIG. 4A is referred to as a non-adjustment state. In the manufacturing process of the screen 110, an arrangement angle of the light transmission diffusion film 112A is adjusted in the Z plane. Here, the arrangement angle is an angle formed by the X' direction of the light transmission diffusion film 112A with the X direction, and an angle formed by the Y' direction of the light transmission diffusion film 112A with the Y direction.

The light transmission diffusion film 112A is rotated by a constant angle in a clockwise direction in the Z plane from the non-adjustment state. Thus, as shown by a dotted line in FIG. 5A, the arrangement angle of the light transmission diffusion film 112A is adjusted to a first adjustment angle. The light transmission diffusion film 112A is rotated by another constant angle in the clockwise direction in the Z plane from the non-adjustment state. Thus, as indicated by a one-dot and dash line in FIG. 5A, the arrangement angle of the light transmission diffusion film 112A is adjusted to a second adjustment angle. The second adjustment angle is larger than the first adjustment angle.

The arrangement angle of the light transmission diffusion film 112A of FIG. 5B is the first adjustment angle. A diffusion angle in the X direction of a light ray transmitted through the light transmission diffusion film 112A arranged in the state of the dotted line of FIG. 5A is slightly larger than a diffusion angle (see FIG. 4C) in the X direction of a light ray transmitted through the light transmission diffusion film 112A in the non-adjustment state as shown in FIG. 5B. A diffusion angle in the Y direction of a light ray transmitted through the light transmission diffusion film 112A arranged in the state of the dotted line of FIG. 5A is slightly larger than an diffusion angle (see FIG. 4B) in the Y direction of a light ray transmitted through the light transmission diffusion film 112A in the non-adjustment state.

An arrangement angle of the light transmission diffusion film 112A of FIG. 5C is the second adjustment angle. A diffusion angle in the X direction of a light ray transmitted through the light transmission diffusion film 112A arranged in a state of the one-dot and dash line of FIG. 5A is slightly larger than a diffusion angle (see FIG. 5B) in the X direction of a light ray transmitted through the light transmission diffusion film 112A arranged in a state of the dotted line of FIG. 5A as shown in FIG. 5C. A diffusion angle in the Y direction of a light ray transmitted through the light transmission diffusion film 112A arranged in the state of the one-dot and dash line of FIG. 5A is slightly larger than a diffusion angle in the Y direction of a light ray transmitted through the light transmission diffusion film 112A arranged in the state of the dotted line of FIG. 5A.

In this manner, when the arrangement angle of the light transmission diffusion film 112A is changed, the diffusion angle in the X direction of the light ray transmitted through the light transmission diffusion film 112A is changed. A manufacturer of the screen 110 appropriately adjusts the arrangement angle of the light transmission diffusion film 112A while repeating trial and error in consideration of positions and the number of the light ray generators 120 of FIG. 2, and the larger number of parameters such as a position of the viewing area 300. Thus, an arrangement angle at which a diffusion angle in the X direction of a light ray transmitted through the light transmission diffusion film 112A coincides with a target angle, described below, can be determined.

After the arrangement angle of the light transmission diffusion film 112A is determined, the light transmission diffusion film 112A is stacked on an inner peripheral surface of the basic diffusion member 111 with the determined arrangement angle being maintained as shown in FIG. 5D.

An upper end surface of the adjustment diffusion member 112 is preferably shaped to be substantially on the same plane as an upper end surface of the basic diffusion member 111. Thus, the adjustment diffusion member 112 is formed on the inner peripheral surface of the basic diffusion member 111, and the screen 110 is completed. In this configuration, the screen 110 largely diffuses and transmits an incident light in the ridge line direction T, and slightly diffuses and transmits the incident light at an appropriate angle in a circumferential direction R.

While the light transmission diffusion film 112A is stacked on the inner peripheral surface of the basic diffusion member 111 in the present embodiment, the present invention is not limited to this. The light transmission diffusion film 112A may be stacked on the outer peripheral surface of the basic diffusion member 111. Thus, the adjustment diffusion member 112 is stacked on the outer peripheral surface of the basic diffusion member 111.

While the light transmission diffusion film 112A is constituted by the anisotropic diffusion member having one large area in the present embodiment, the present invention is not limited to this. The light transmission diffusion film 112A may be constituted by an anisotropic diffusion member having a plurality of small areas. While the light transmission diffusion film 112A has a shape and the function similar to the light transmission diffusion film 111A, the present invention is not limited to this. The light transmission diffusion film 112A may have a shape or the function different from the light transmission diffusion film 111A.

(3) Operation of Light Ray Generator

Figure 6:
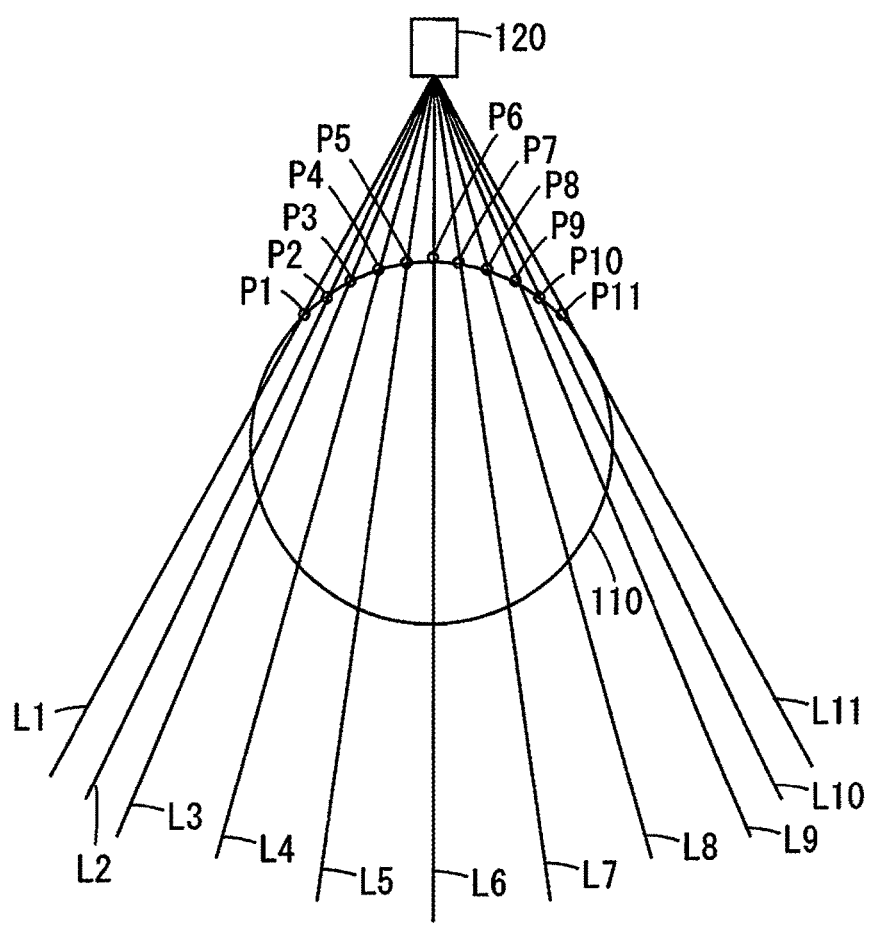
FIG. 6 is a schematic plan view for explaining an operation of a light ray generator.

FIG. 6 is a schematic plan view for explaining an operation of the light ray generator 120. In FIG. 6, only one light ray generator 120 is shown. As described above, the light ray generator 120 can emit a light ray made of laser light, and deflect the light ray in horizontal and vertical planes.

The light ray generator 120 deflects a light ray in the horizontal plane, so that the outer peripheral surface of the screen 110 can be scanned in a horizontal direction. Further, the light ray generator 120 deflects a light ray in the vertical plane, so that the outer peripheral surface of the screen 110 can be scanned in a vertical direction. Thus, the light ray generator 120 can scan a plane opposite to the screen 110 with a light ray. Further, the light ray generator 120 can set a color of a light ray in every direction of the light ray. Further, the light ray generator 120 emits a light ray group made of a plurality of light rays in a pseudo manner.

In FIG. 6, the screen 110 is irradiated with a plurality of light rays L1 to L11 by the light ray generator 120. The light rays L1 to L11 are respectively set to any color. Thus, the light rays L1 to L11 of the respectively set colors are transmitted through a plurality of positions P1 to P11 of the screen 110.

The screen 110 slightly diffuses and transmits the light rays L1 to L11 at appropriate angles in a circumferential direction, so that the viewer can view substantially the only one light ray in one position. Further, the screen 110 diffuses and transmits the light rays L1 to L11 in the ridge line direction (the vertical direction), so that the viewer can view substantially the one light ray from any position in an up-and-down direction.

(4) Method of Presenting Three-Dimensional Image

Figure 7:
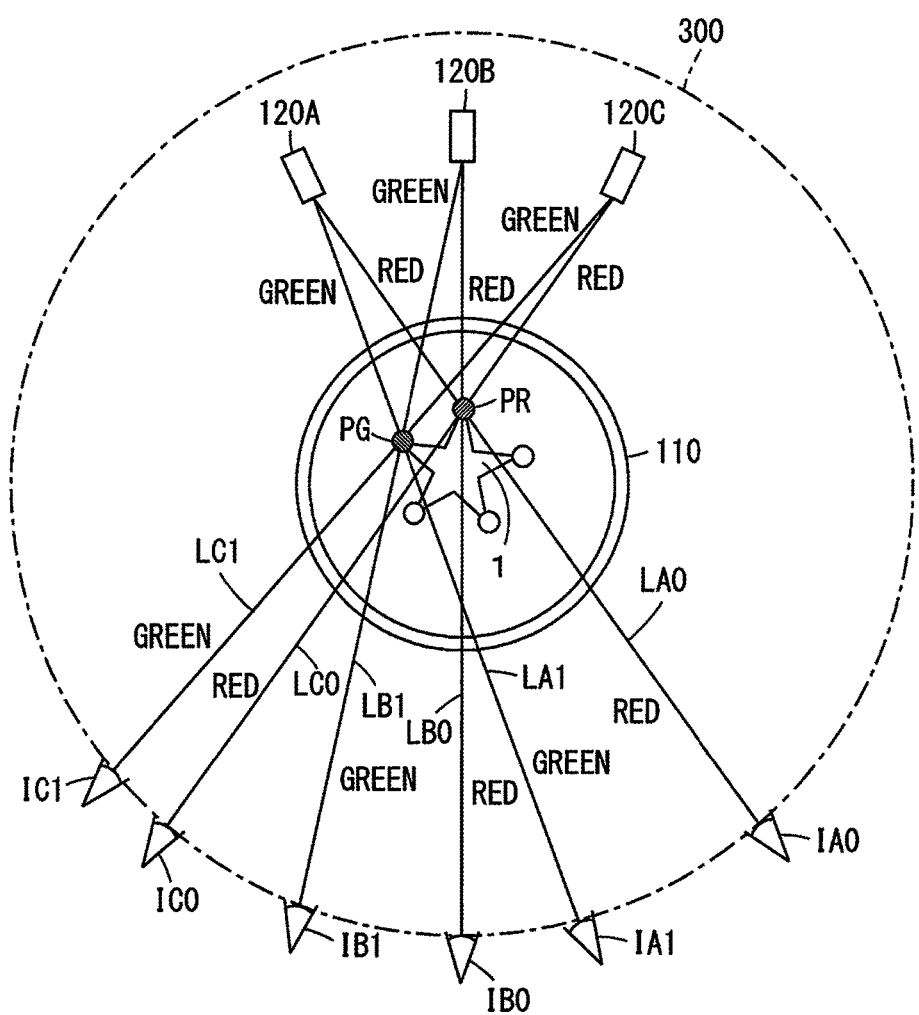
FIG. 7 is a schematic plan view for explaining a method of presenting a three-dimensional image.

FIG. 7 is a schematic plan view for explaining the method of presenting the three-dimensional image. In FIG. 7, the three light ray generators 120 are shown. The three light ray generators 120 of FIG. 7 are respectively referred to as light ray generators 120A, 120B, 120C.

For example, in the case where a red pixel is presented in a position PR above the screen 110, a red light ray LA0 is emitted in a direction passing through the position PR from the light ray generator 120A, a red light ray LB0 is emitted in a direction passing through the position PR from the light ray generator 120B, and a red light ray LC0 is emitted in a direction passing through the position PR from the light ray generator 120C. Thus, a red pixel to be a point light source is presented at a crossing point of the red light rays LA0, LB0, LC0. In this case, in the case where eyes of the viewer are in the position IA0, the position IB0 or the position IC0, the red pixel is viewed in the position PR.

Similarly, in the case where a green pixel is presented in a position PG above the screen 110, a green light ray LA1 is emitted in a direction passing through the position PG from the light ray generator 120A, a green light ray LB1 is emitted in a direction passing through the position PG from the light ray generator 120B, and a green light ray LC1 is emitted in a direction passing through the position PG from the light ray generator 120C. Thus, a green pixel to be a point light source is presented at a crossing point of the green light rays LA1, LB1, LC1. In this case, when eyes of the viewer are in the position IA1, a position IB1, or a position IC1, a green pixel is viewed in the position PG.

In this manner, light rays of the color to be presented in a direction passing through each position of the three-dimensional image 1 are emitted from each of the plurality of light ray generators 120. The plurality of light ray generators 120 are densely annularly arranged, and a space inside of the screen 110 is sufficiently densely filled with cross point groups by light ray groups emitted from these plurality of light ray generators 120.

According to this configuration, appropriate light rays passing through the positions PR and PG are incident on eyes when the inside of the screen 110 is observed in any direction on the viewing area 300. Therefore, human eyes identify as if point light sources exist there. Because a person identifies illumination light reflected or diffused at the surface of a real object as an object, the surface of the object can be considered as the collection of point light sources. That is, the colors in the positions PR and PG to be a surface of the object are appropriately reproduced using light rays traveling from the plurality of light ray generators 120, so that the three-dimensional image 1 can be presented to a space inside and above the screen 110.

In the present embodiment, the screen 110 is sufficiently largely formed. Therefore, the large number of viewers can view the same three-dimensional image 1 in different directions in different positions on the viewing area 300.

Figure 8:
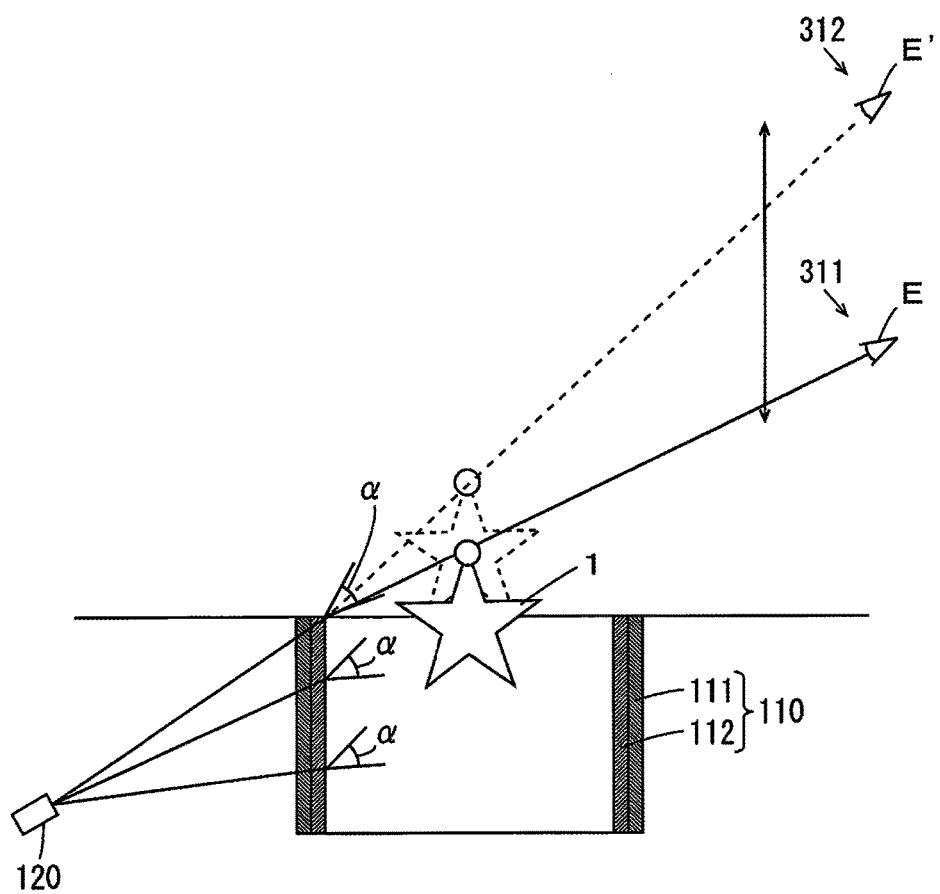
FIG. 8 is a schematic cross sectional view for explaining the method of presenting the three-dimensional image.

FIG. 8 is a schematic cross sectional view for explaining the method of presenting the three-dimensional image. In FIG. 8, one light ray generator 120 is shown. As shown in FIG. 8, a light ray emitted from the light ray generator 120 is diffused in a vertical direction at a diffusion angle $\alpha$ by the screen 110. Thus, the plurality of viewers can view a light ray of the same color emitted from the light ray generator 120 in different positions in the vertical direction in a range of the diffusion angle $\alpha$.

For example, when one viewer 311 is viewing a portion of the three-dimensional image 1 from a reference position E, another viewer 312 can view the same portion of the three-dimensional image 1 from a position E' above the reference position E. In this manner, a light ray emitted from the light ray generator 120 is diffused at the screen 110 in the vertical direction, so that the plurality of viewers can observe the same portion of the three-dimensional image 1 from different positions in the up-and-down direction.

Further, the light ray emitted from the light ray generator 120 is slightly diffused by the screen 110 in the circumferential direction such that a diffusion angle is a target angle. The target angle is a diffusion angle of each light ray at which a missing portion is not generated in the three-dimensional image 1 in the circumferential direction for the viewing area 300. Thus, the viewer 310 can view the three-dimensional image 1 in which a missing portion is not generated in the X direction from the viewing area 300. Thus, the viewer can observe the three-dimensional image 1 from which a missing portion is absent in the circumferential direction.

Color of each light ray of a light ray group emitted by the plurality of light ray generators 120 of FIG. 1 is calculated by the control device 130 based on three-dimensional data stored in the storage device 140. Specifically, the control device 130 acquires a crossing point of a surface of the three-dimensional image that is defined in advance as the three-dimensional data and each light ray, and calculates an appropriate color to be supplied to the light ray.

The control device 130 controls the plurality of light ray generators 120 based on the calculated color of each light ray of the light ray group. Thus, light ray groups respectively having calculated colors are emitted from each light ray generator 120 such that the three-dimensional image 1 is presented to a space above the screen 110. In this manner, the three-dimensional image display apparatus 100 according to the present embodiment enables directional display of the three-dimensional image 1.

Figure 9:
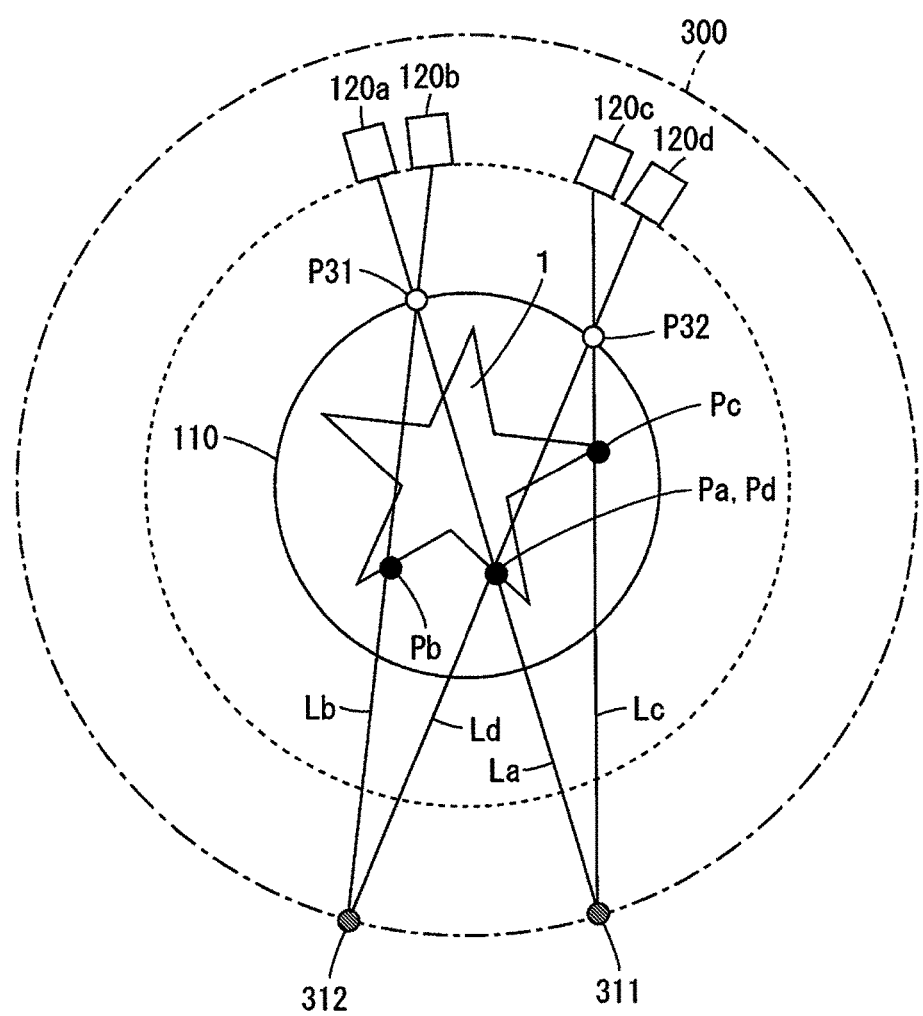
FIG. 9 is a schematic plan view for explaining a principle of producing a three-dimensional image that can be observed from the entire circumference in the three-dimensional image display apparatus according to the present embodiment.

(5) Principle of Producing Three-Dimensional Image that can be Observed from Entire Circumference FIG. 9 is a schematic plan view for explaining the principle of producing the three-dimensional image that can be observed from the entire circumference in the three-dimensional image display apparatus 100 according to the present embodiment. In FIG. 9, four light ray generators 120a, 120b, 120c, 120d are shown.

In FIG. 9, in the case where the viewers 311, 312 view a point P31 of the screen 110, a light ray La emitted from the light ray generator 120a is incident on eyes of the viewer 311, and a light ray Lb emitted from the light ray generator 120b is emitted on eyes of the viewer 312. Further, in the case where the viewers 311, 312 view a point P32 of the screen 110, a light ray Lc emitted from the light ray generator 120c is incident on the eyes of the viewer 311, and a light ray Ld emitted from the light ray generator 120d is incident on the eyes of the viewer 312.

Here, the color of the light ray La and the color of the light ray Ld are the same, the color of the light ray Lb is different from the color of the light ray La, and the color of the light ray Lc is different from the color of the light ray Ld. In this case, the color of the point P31 on the screen 110 is different depending on a viewing direction. Further, the color of the point P32 on the screen 110 is also different depending on the viewing direction.

A point Pa of the three-dimensional image 1 is formed by the light ray La, a point Pb of the three-dimensional image 1 is formed by the light ray Lb, a point Pc of the three-dimensional image 1 is formed by the light ray Lc, and a point Pd of the three-dimensional image 1 is formed by the light ray Ld. The plurality of light ray generators 120 are arranged to surround the screen 110, so that points on the entire circumference of the three-dimensional image 1 are formed by a light ray of any of the light ray generators 120.

According to this configuration, even when the viewer observes the inside of the screen 110 from any position on the entire circumference on the viewing range 300, a light ray passing through the position at which the three-dimensional image 1 is to be presented is to be incident on eyes of the viewer. In this case, the eyes of the viewer identify as if point light sources exist in the position. Because the viewer identifies illumination light reflected or diffused at the surface of a real object as an object, the surface of the object can be considered as the collection of point light sources. That is, the color of a position to be a surface of the object is appropriately reproduced by light rays emitted by the plurality of light ray generators 120, whereby the three-dimensional image 1 that can be observed from the entire circumference can be presented to a space inside or above the screen 110.

In the example of FIG. 9, the point Pa and the point Pd of the three-dimensional image 1 are located in the same position. That is, the points Pa, Pd of the three-dimensional image 1 are formed at a crossing point of the light ray La and the light ray Ld. Even in this case, the viewers 311, 312 can observe the same portion of the three-dimensional image 1 in respective different directions.

(6) First Modified Example

While the screen 110 in the present embodiment is cylindrical, the present invention is not limited to this. The screen 110 may be in another shape such as a conical shape, a frustoconical shape, a polygonal prism shape, a polygonal pyramid trapezoid shape, or a polygonal pyramid shape. Because the cylindrical screen 110 in the present embodiment is large, the screen 110 may be close to a polygonal prism shape.

Further, the screen 110 may be constituted by an assembly of a plurality of divided members. For example, the screen 110 having a cylindrical shape or a curved shape may be constituted by an assembly of a plurality of members having an arc pillar shape. Alternatively, the screen 110 having a polygonal shape or a planar shape may be constituted by an assembly of members having a planar shape.

Figure 10:
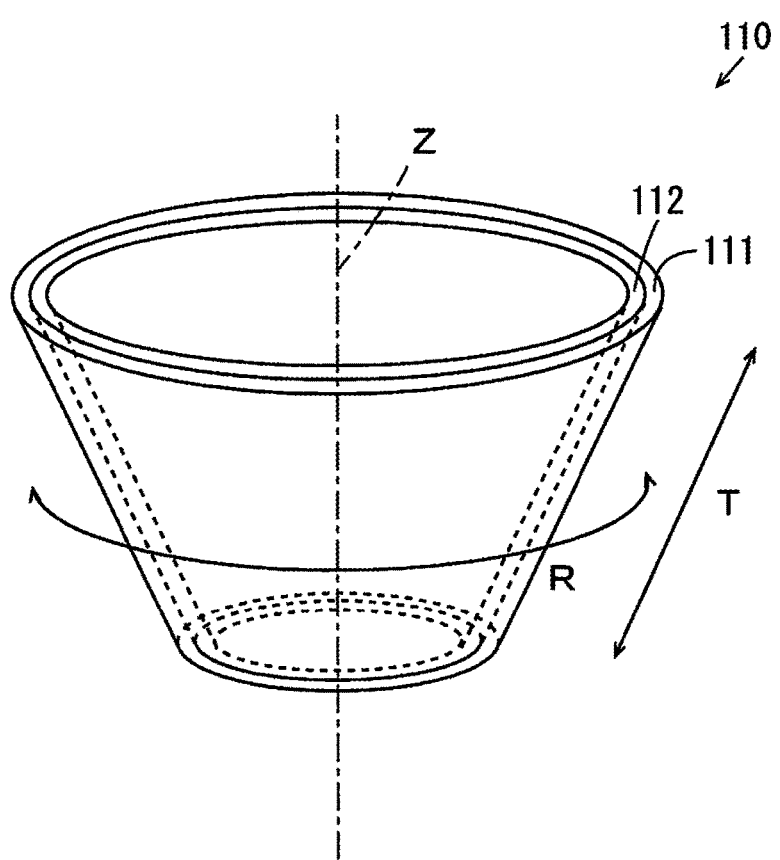
FIG. 10 is a schematic diagram showing the configuration of the screen in a first modified example.

FIG. 10 is a schematic diagram showing the configuration of the screen 110 in the first modified example. As shown in FIG. 10, the screen 110 in the first modified example has a rotationally-symmetric frustoconical shape about the axis Z. A top of a large diameter and a bottom of a small diameter of the screen 110 are open.

The screen 110 in the first modified example has the configuration in which the basic diffusion member 111 and the adjustment diffusion member 112 are stacked similarly to the screen 110 of FIG. 3. An arrangement angle of the light transmission diffusion film 112A is determined such that a diffusion angle in the circumferential direction R (the X direction) of a light ray transmitted through the light transmission diffusion film 112A coincides with the target angle. Thus, the screen 110 largely diffuses and transmits an incident light ray in the ridge line direction T, and slightly diffuses and transmits at an appropriate angle in the circumferential direction R.

Figure 11A:
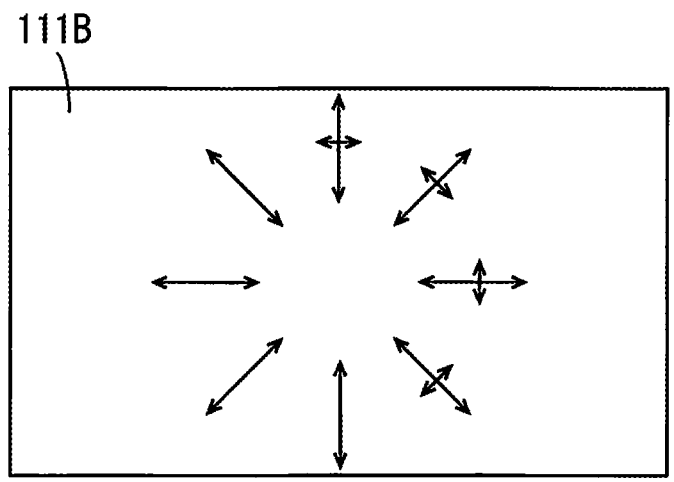
FIGS. 11A to 11C are schematic diagrams for explaining a first method of manufacturing the screen in the first modified example.
Figure 11B:
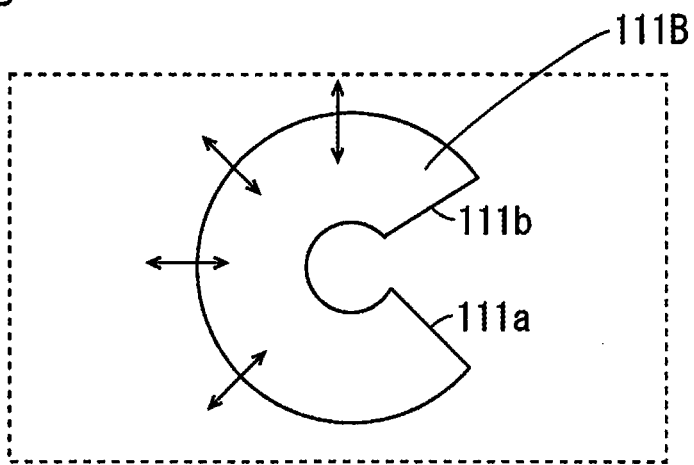
Figure 11C:
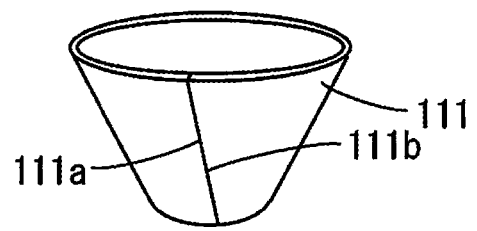

FIGS. 11A to 11C are schematic diagrams for explaining a first method of manufacturing the screen 110 in the first modified example. As shown in FIG. 11A, a light transmission diffusion film 111B is prepared. The light transmission diffusion film 111B is a holographic screen or a fresnel lens, for example, and has the function of diffusing an incident light ray in a radial direction. The fresnel lens is a sheet-like lens having a groove in a circumferential direction.

As shown in FIG. 11B, a portion of the light transmission diffusion film 111B is cut such that the light transmission diffusion film 111B has a form of a sector. Next, as shown in FIG. 11C, an end portion 111a and an end portion 111b of the light transmission diffusion film 111B having a form of a sector are joined together, so that a basic diffusion member 111 having a frustoconical shape is fabricated. The adjustment diffusion member 112 is stacked on the basic diffusion member 111 of FIG. 11C, so that the screen 110 in the first modified example is manufactured.

Figure 12A:
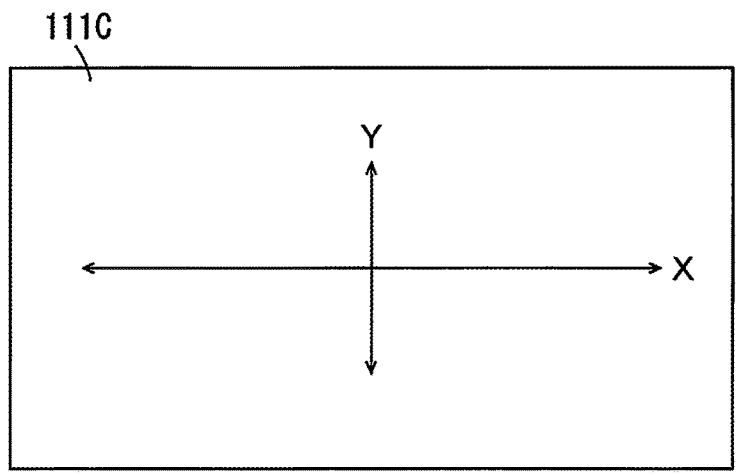
FIGS. 12A to 12C are schematic diagrams for explaining a second method of manufacturing the screen in the first modified example.
Figure 12B:
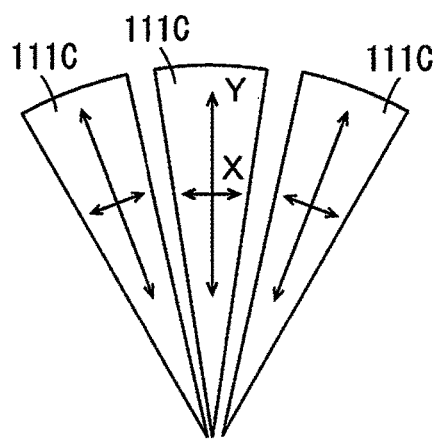
Figure 12C:
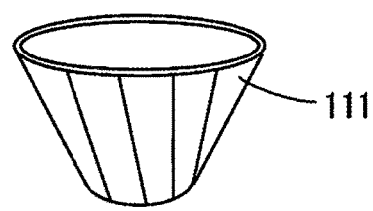

FIGS. 12A to 12C are schematic diagrams for explaining a second method of manufacturing the screen 110 in the first modified example. As shown in FIG. 12A, a light transmission diffusion film 111C is prepared. The light transmission diffusion film 111C has a shape and light transmission diffusion characteristics similar to those of the light transmission diffusion film 111A of FIG. 4A.

As shown in FIG. 12B, the light transmission diffusion film 111C is cut into a plurality of portions. Each light transmission diffusion film 111C is triangular. Next, as shown in FIG. 12C, the plurality of triangular light transmission diffusion films 111C are attached to an outer peripheral surface or an inner peripheral surface of a transparent frustoconical shape member, so that the base diffusion member 111 having a frustoconical shape is fabricated. The adjustment diffusion member 112 is stacked on the basic diffusion member 111 of FIG. 12C, so that the screen 110 in the first modified example is manufactured.

(7) Second Modified Example

Figure 13:
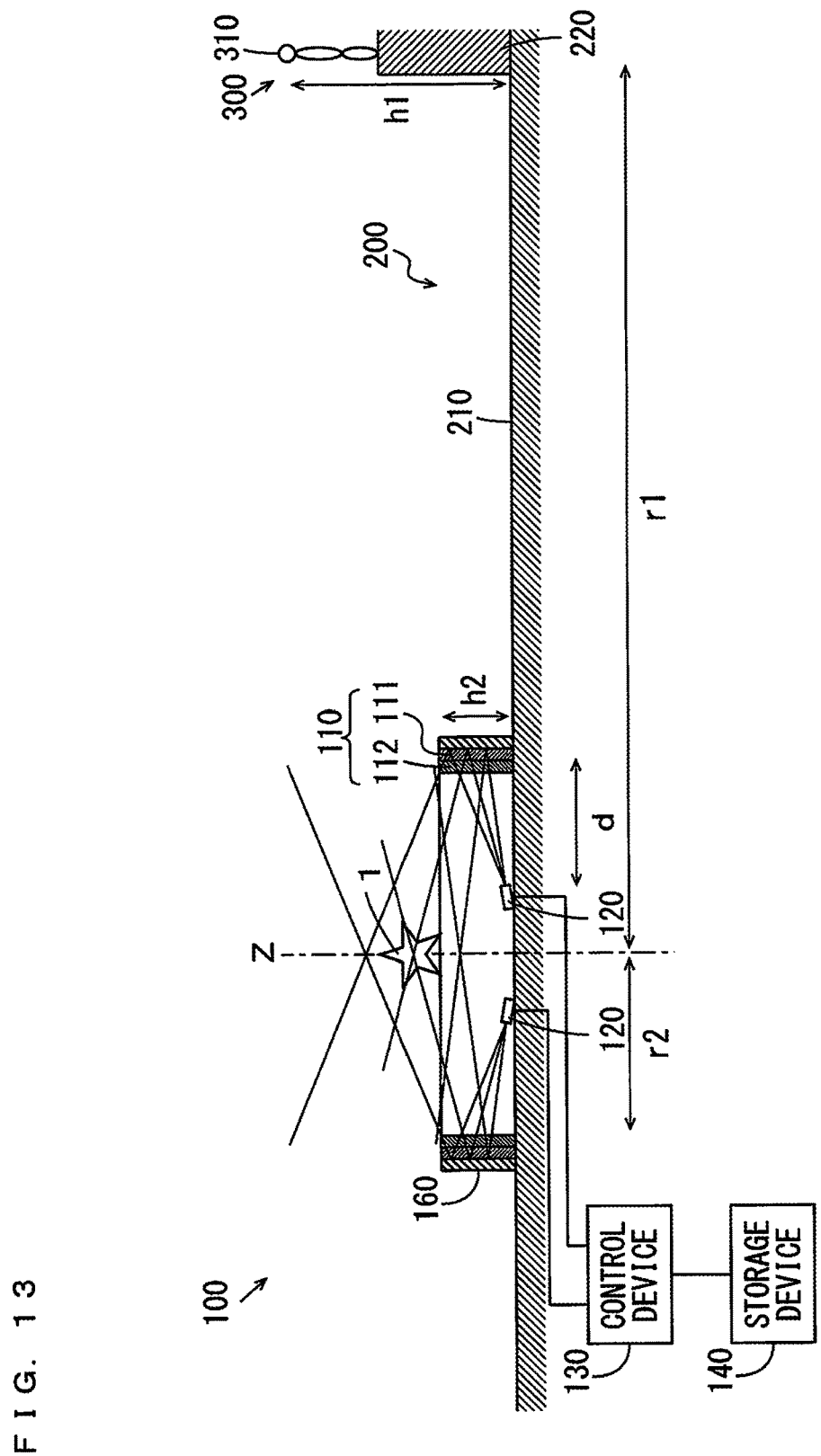
FIG. 13 is a schematic cross sectional view of the three-dimensional image display apparatus according to a second modified example.

While the light ray generator 120 is arranged to surround the screen 110 in the present embodiment, the present invention is not limited to this. The light ray generator 120 may be arranged inside of the screen 110. FIG. 13 is a schematic cross sectional view of a three-dimensional image display apparatus 100 according to the second modified example. As for the three-dimensional image display apparatus 100 of FIG. 13, differences from the three-dimensional image display apparatus 100 of FIG. 1 will be described.

As shown in FIG. 13, the three-dimensional image display apparatus 100 according to the second modified example includes a cylindrical reflection member 160 instead of the cover member 150 of FIG. 1. The reflection member 160 is a mirror, for example. The screen 110 is stacked on an inner peripheral surface of the reflection member 160.

The plurality of light ray generators 120 are annularly arranged inside of the screen 110 about the axis Z of the screen 110. The shortest distance between the screen 110 and each light ray generator 120 is d. While the distance d is smaller than the radius r2 of the screen 110 in the present example, the distance d may be larger than the radius r2 of the screen 110.

Each light ray generator 120 emits a light ray group made of a plurality of light rays to the inner peripheral surface of the screen 110. The light ray group transmitted through the screen 110 is reflected by the inner surface of the reflection member 160, and is transmitted through the screen 110 again to reach the viewing area 300.

According to this configuration, it is not necessary to arrange the light ray generator 120 outside of the screen 110. Further, the light ray generator 120 is not viewed from the viewing area 300, so that it is not necessary to provide the cover member 150 in the three-dimensional image display apparatus 100. Thus, the size of the three-dimensional image display apparatus 100 can be reduced.

(8) Effects

In the three-dimensional image display apparatus 100 according to the present embodiment, the screen 110 has a stacking structure of the basic diffusion member 111 and the adjustment diffusion member 112. The basic diffusion member 111 diffuses and transmits each light ray from the light ray generator 120 at the first angle in a plane parallel to the X direction, and diffuses and transmits the light ray at the second angle larger than the first angle in a plane parallel to the Y direction. The adjustment diffusion member 112 diffuses and transmits each light ray from the light ray generator 120 at the third angle in a plane parallel to the X' direction, and diffuses and transmits the light ray at the fourth angle larger than the third angle in a plane parallel to the Y' direction.

A relative inclination of the adjustment diffusion member 112 with the basic diffusion member 111 is changed to adjust an angle formed by the X' direction with the X direction. Thereafter, the basic diffusion member 111 and the adjustment diffusion member 112 are stacked, so that a diffusion angle of each light ray by the screen 110 in the first plane is adjusted to the target angle with a simple configuration. Here, the target angle is a diffusion angle of each light ray in the case where a missing portion is not generated in the three-dimensional image 1 in the X direction for the viewing area 300. Thus, the viewer 310 can observe the three-dimensional image 1 in which a missing portion is not generated in the X direction from the viewing area 300.

In this configuration, when the diffusion angle of each light ray by the screen 110 is adjusted while trial and error are repeated in consideration of the viewing area 300, the positions and the numbers of the light ray generators 120 and the like, only the stacking situation of the basic diffusion member 111 and the adjustment diffusion member 112 may be changed. It is not necessary to repeat the manufacture and test of the screen 110. Thus, even in the case where the size of the screen 110 is increased, increases in cost and manufacturing time period for the screen 110 are inhibited. As a result, the three-dimensional image 1 can be presented to the large number of viewers 310 in a large space.

Further, in the present embodiment, the X direction is a horizontal direction, and the screen 110 has a shape surrounding the axis Z extending in the vertical direction. The viewing area 300 is defined on a horizontal plane to surround the screen 110. The light ray generators 120 are arranged around the screen 110 to irradiate the outer peripheral surface of the screen 110 with a light ray group from outside of the screen 110. Therefore, the viewer 310 can observe the three-dimensional image 1 presented to a space above or inside of the screen 110 with naked eyes from the viewing area 300 defined on the horizontal plane to surround the screen 110.

[2] Second Embodiment (1) Configuration and Manufacturing Method of Screen

In the first embodiment, the arrangement angle of the light transmission diffusion film 112A is adjusted in the Z plane, so that the diffusion angle of the light ray in the circumferential direction R of the screen 110 is adjusted. However, the present invention is not limited to this. As for the three-dimensional image display apparatus 100 according to the second embodiment, differences from the three-dimensional image display apparatus 100 according to the first embodiment will be described below. In the second embodiment, a plurality of types of light transmission diffusion films having different light transmission diffusion characteristics are prepared in order to form the adjustment diffusion member 112.

Figure 14A:
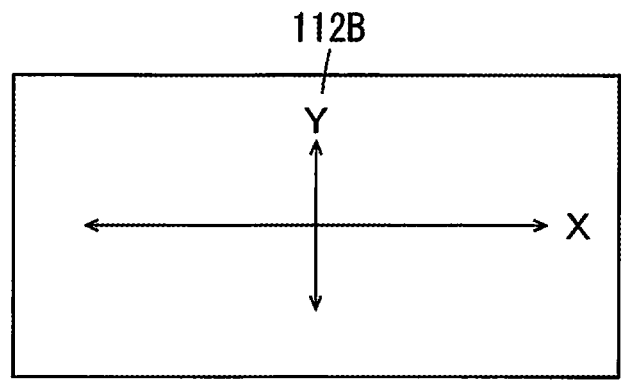
FIGS. 14A to 14C are diagrams showing a light transmission diffusion film having one type of light transmission diffusion characteristics.
Figure 14B:
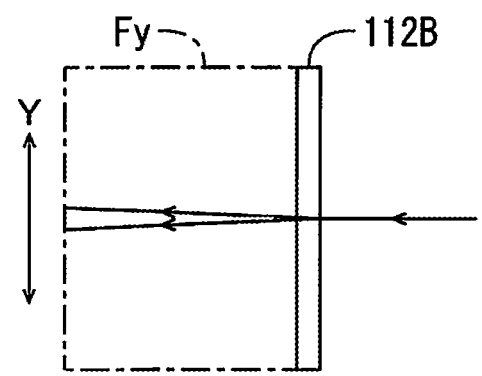
Figure 14C:
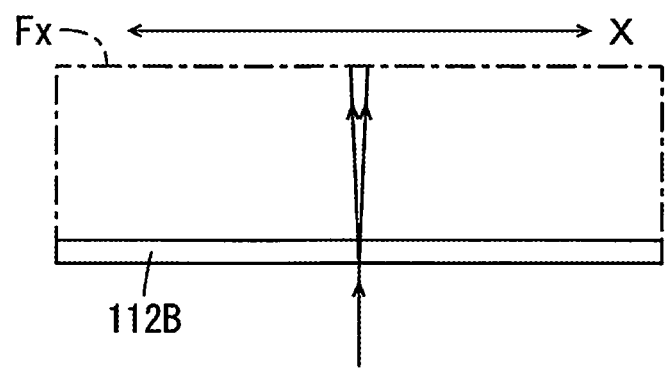

FIGS. 14A to 14C are diagrams showing a light transmission diffusion film having one type of light transmission diffusion characteristics. The light transmission diffusion film 112B of FIG. 14A is an isotropic diffusion member, and is formed to have the same configuration in the X and Y directions orthogonal to each other.

A light ray incident on the light transmission diffusion film 112B of FIG. 14A is diffused and transmitted in the Y direction in a Y plane Fy as shown in FIG. 14B, and is diffused and transmitted in an X plane Fx as shown in FIG. 14C. Diffusion angles of the light ray transmitted through the light transmission diffusion film 112B in the Y and X directions are equal to each other.

Figure 15A:
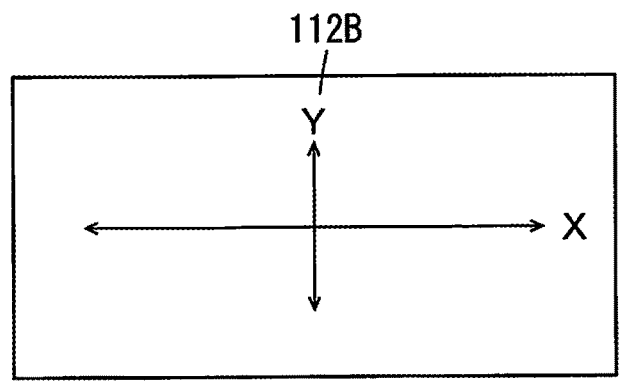
FIGS. 15A to 15C are diagrams showing a light transmission diffusion film having another type of light transmission diffusion characteristics.
Figure 15B:
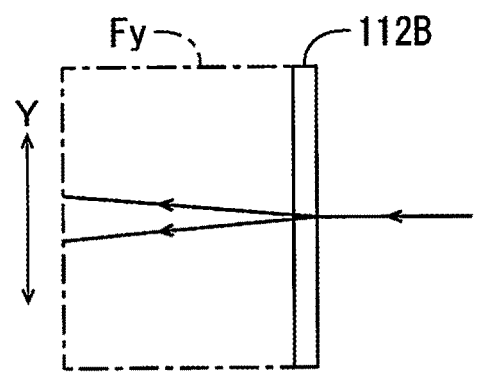
Figure 15C:
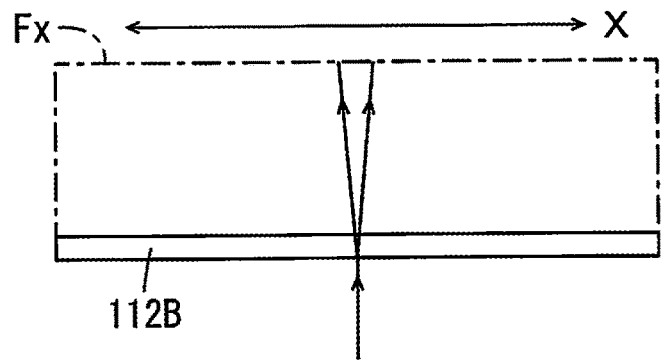

FIGS. 15A to 15C are diagrams showing a light transmission diffusion film having another type of light transmission diffusion characteristics. Similarly to the light transmission diffusion film 112B of FIG. 14A, the light transmission diffusion film 112B of FIG. 15A is an isotropic diffusion member, and formed to have the same configuration in the X and Y directions orthogonal to each other.

A light ray incident on the light transmission diffusion film 112E of FIG. 15A is diffused and transmitted in the Y direction in the Y plane Fy as shown in FIG. 15B, and is diffused and transmitted in the X plane Fx as shown in FIG. 15O. Diffusion angles of the light ray transmitted through the light transmission diffusion film 112B of FIG. 15A in the Y and X directions are equal to each other. Further, the diffusion angles of the light ray transmitted through the light transmission diffusion film 112B of FIG. 15A in the Y and X directions are larger than the diffusion angles of the light ray transmitted through the light transmission diffusion film 112B of FIG. 14A in the Y and X directions.

In this manner, a diffusion angle of a light ray in the X direction is different for every light transmission diffusion film 112E having each of the plurality of types. The manufacturer of the screen 110 can determine the light transmission diffusion film 112B at which the diffusion angle of the light ray in the X direction coincides with the target angle while repeating trial and error in consideration of positions and the number of the light ray generators 120 of FIG. 2 and a large number of parameters such as a position of the viewing area 300.

The determined light transmission diffusion film 112B is stacked on an inner peripheral surface or an outer peripheral surface of the basic diffusion member 111 of FIG. 4D. Thus, the adjustment diffusion member 112 is formed on the inner peripheral surface or the outer peripheral surface of the basic diffusion member 111, and the screen 110 is completed. In this configuration, the screen 110 largely diffuses and transmits an incident light ray in the ridge line direction T, and slightly diffuses and transmits the incident light ray at an appropriate angle in the circumferential direction R.

While the plurality of types of light transmission diffusion films 112B are constituted by isotropic diffusion members in the present embodiment, the present invention is not limited to this. If the light transmission diffusion characteristics in the X direction are different from one another, part or all of the plurality of types of light transmission diffusion films 112B may be constituted by anisotropic diffusion members.

(2) Effects

In the three-dimensional image display apparatus 100 according to the present embodiment, the plurality of types of light transmission diffusion films 112б are selected such that a diffusion angle of each light ray by the screen 110 in the first plane is equal to the target angle. Thereafter, the basic diffusion member 111 and the adjustment diffusion member 112 are stacked, so that the diffusion angle of each light ray by the screen 110 in the first plane is adjusted to the target angle. Thus, the diffusion angle of each light ray by the screen 110 in the first plane can be adjusted to the target angle with a simple configuration. As a result, the viewer 310 can observe the three-dimensional image 1 in which a missing portion is not generated in the X direction from the viewing area 300.

[3] Other Embodiments (1) While the screen 110 is rotationally symmetric in the above-mentioned embodiment, the present invention is not limited to this. The screen 110 may have a large planer shape or another shape such as a curved shape. In this case, the plurality of light ray generators 120 are arranged behind the screen 110, and the auditorium 220 is provided in front of the screen 110. The viewing area 300 substantially parallel to the screen 110 is defined on the auditorium 220. Further, a light collection member such as a fresnel lens (not shown) is preferably arranged between the screen 110 and the auditorium 220.

This configuration causes the three-dimensional image 1 to be presented to a space in front of or behind the screen 110. The large number of viewers 310 present in the auditorium 220 in front of the screen 110 can observe the three-dimensional image 1 presented by the screen 110 having a planar shape or a curved shape from any position in the viewing area 300.

While the plurality of light ray generators 120 are arranged behind the screen 110 in the present embodiment, the present invention is not limited to this. Similarly to the second modified example of the first embodiment, in the case where the reflection member is arranged behind the screen 110, the plurality of light ray generators 120 may be arranged to emit a light ray to the screen 110 from a position in front of the screen 110.

(2) While the screen 110 has the configuration in which the two light transmission diffusion members are stacked in the above-mentioned embodiment, the present invention is not limited to this. The screen 110 may have the configuration in which three or more light transmission diffusion members are stacked. For example, two or more adjustment diffusion members 112 may be stacked on one basic diffusion member 111.

Here, the light transmission diffusion characteristics of the two or more adjustment diffusion members 112 may have wavelength dependencies different from each other. In this case, only a diffusion angle of a light ray of a specific wavelength region such as a red wavelength region, a green wavelength region, or a blue wavelength region among the light transmitted through the screen 110 can be individually adjusted. Thus, a prismatic effect in which specific colors of the three-dimensional image 1 are blurred due to the wavelength characteristics of light can be removed.

(3) While the upper portion of the screen 110 is open in the above-mentioned embodiment, the present invention is not limited to this. The upper portion of the screen 110 may be closed by an arrangement of a transparent member such as a glass plate in the vicinity of the upper portion of the screen 110. Alternatively, a substantially horizontal transparent member may be arranged inside of the screen 110.

In this case, a real object can be arranged on the transparent member. Thus, the real object and the three-dimensional image 1 can be arranged to be presented to a space above or inside of the screen 110. For example, a real performer such as a dancer and a performer of the three-dimensional image 1 can appear together in an upper portion of the screen 110. Further, the radius r2 of the screen 110 in which a transparent member is arranged can be smaller than the radius r2 of the screen 110 in which the transparent member is arranged in the upper portion.

(4) While the screen 110 and the light ray generator 120 are arranged on the ground 210 in the above-mentioned embodiment, the present invention is not limited to this. The screen 110 and the light ray generator 120 may be arranged to be buried in the ground 210. In this case, the three-dimensional image 1 can be presented at substantially the same height as the ground 210. Therefore, a real object and the three-dimensional image 1 on the ground 210 can be arranged to be presented.

(5) While each light ray generator 120 is arranged to emit a light ray to the screen 110 from a position obliquely downward in the above-mentioned embodiment, the present invention is not limited to this. Each light ray generator 120 may be arranged to horizontally emit a light ray to the screen 110.

(6) While the three-dimensional image display apparatus 100 preferably includes the plurality of light ray generators 120 as shown in FIG. 2 in the above-mentioned embodiment, the present invention is not limited to this. The three-dimensional image display apparatus 100 may include one light ray generator 120 provided to be movable or rotatable. In this case, the light ray generator 120 time-divisionally emits a light ray set to any color according to a position to the outer peripheral surface of the screen 110.

(7) While the three-dimensional image display apparatus 100 includes the cover member 150 covering outside or above the plurality of light ray generators 120 in the above-mentioned embodiment except for the second modified example of the first embodiment, the present invention is not limited to this. In the case where the plurality of light ray generators 120 are arranged not to be viewed from the viewer 310, or the case where the plurality of light ray generators 120 may be viewed from the viewer 310, the three-dimensional image display apparatus 100 does not have to include the cover member 150.

[4] Correspondences Between Constituent Elements in Claims and Parts in Preferred Embodiments In the following paragraphs, non-limiting examples of correspondences between various elements recited in the claims below and those described above with respect to various preferred embodiments of the present invention are explained.

In the above-mentioned embodiment, the viewing area 300 is an example of a viewing area, the viewers 310 to 312 are examples of a viewer, the three-dimensional image 1 is an example of a three-dimensional image, and the three-dimensional image display apparatus 100 is an example of a three-dimensional image display apparatus. The basic diffusion member 111 and the adjustment diffusion member 112 are respectively examples of first and second light transmission diffusion members, the screen 110 is an example of a screen, the light ray generator 120 is an example of a light ray generator, and the control device 130 is an example of a controller.

The circumferential direction R or X direction are examples of a first direction, the ridge line direction T or the Y direction are examples of a second direction, the X' direction is an example of a third direction, and the Y' direction is an example of a fourth direction. The X plane Fx is an example of a first plane, the Y plane Fy is an example of a second plane, a plane parallel to the X' direction is an example of a third plane, and a plane parallel to the Y' direction is an example of a fourth plane.

As each of constituent elements recited in the claims, various other elements having configurations or functions described in the claims can be also used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

INDUSTRIAL APPLICABILITY

The present invention can be effectively utilized for various types of three-dimensional image display apparatuses that display three-dimensional images, and a method of presenting the three-dimensional image.

I claim:

1. A three-dimensional image display method for presenting a three-dimensional image to an observer in a viewing area on a predetermined virtual plane based on three-dimensional data, comprising the steps of:
    arranging a screen;
    irradiating the viewing area with a light ray group made of a plurality of light rays through the screen by a light ray generator; and
    controlling the light ray generator such that the three-dimensional image is presented by the light ray group generated by the light ray generator based on the three-dimensional data,
    wherein a first direction parallel to the virtual plane is defined on a surface of the screen, and a second direction orthogonal to the first direction is defined on the surface of the screen,
    wherein the step of arranging the screen includes the steps of:
        preparing a first light transmission diffusion member that has a characteristic of diffusing and transmitting each light ray from the light ray generator at a first diffusion angle in a first plane parallel to the first direction and at a second diffusion angle larger than the first diffusion angle in a second plane parallel to the second direction;
        preparing a second light transmission diffusion member that has a characteristic of diffusing and transmitting each light ray from the light ray generator at a third diffusion angle in the first plane; and
        stacking the first and second light transmission diffusion members on each other such that a diffusion angle of each light ray by the screen in the first plane is adjusted to coincide with a target diffusion angle, and wherein the target diffusion angle is a diffusion angle of each light ray with the viewing area without a gap being generated in the three-dimensional image in the first direction.

2. The three-dimensional image display method according to claim 1, wherein third and fourth directions orthogonal to each other are defined on the second light transmission diffusion member, the third direction is an offset from the first direction, the second light transmission diffusion member has a characteristic of diffusing and transmitting each light ray from the light ray generator at the third diffusion angle in a third plane parallel to the third direction and at a fourth diffusion angle larger than the third diffusion angle in a fourth plane parallel to the fourth direction, and the step of stacking the first and second light transmission diffusion members includes the step of adjusting the diffusion angle of each light ray by the screen in the first plane to the target diffusion angle by adjusting an angle formed by the third direction of the second light transmission diffusion member with the first direction.

3. The three-dimensional image display method according to claim 1, wherein the step of preparing the second light transmission diffusion member includes the step of preparing a plurality of types of second light transmission diffusion members respectively having different diffusion angles, and the step of stacking the first and second light transmission diffusion members on each other includes the steps of:

selecting one second light transmission diffusion member from the plurality of types of second light transmission diffusion members; and adjusting the diffusion angle of each light ray by the screen in the first plane to the target diffusion angle by stacking the selected one second light transmission diffusion member on the first light transmission diffusion member.

* * * * *